US012136347B2

(12) United States Patent
Maruyama

(10) Patent No.: US 12,136,347 B2
(45) Date of Patent: Nov. 5, 2024

(54) AIRSPACE INFORMATION PROVISION SYSTEM, AIRSPACE INFORMATION PROVISION METHOD, AND AIRSPACE INFORMATION PROVISION PROGRAM

(71) Applicant: HONDA MOTOR CO., LTD., Tokyo (JP)

(72) Inventor: Kohei Maruyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 305 days.

(21) Appl. No.: 17/640,375

(22) PCT Filed: Jul. 10, 2020

(86) PCT No.: PCT/JP2020/027143
§ 371 (c)(1),
(2) Date: Mar. 4, 2022

(87) PCT Pub. No.: WO2021/049156
PCT Pub. Date: Mar. 18, 2021

(65) Prior Publication Data
US 2022/0335839 A1 Oct. 20, 2022

(30) Foreign Application Priority Data
Sep. 13, 2019 (JP) ................. 2019-166993

(51) Int. Cl.
G08G 5/00 (2006.01)
B64D 45/00 (2006.01)
(Continued)

(52) U.S. Cl.
CPC ........... *G08G 5/0008* (2013.01); *B64D 45/00* (2013.01); *G08G 5/0078* (2013.01);
(Continued)

(58) Field of Classification Search
CPC .. G08G 5/0008; G08G 5/0078; G08G 5/0091; G08G 5/0043; G08G 5/0069;
(Continued)

(56) References Cited

U.S. PATENT DOCUMENTS 10,055,998 B1 * 8/2018 Reinke ................. G08G 5/0082
2007/0260366 A1 * 11/2007 Lacaze ..................... G01W 1/00
701/3

(Continued)

FOREIGN PATENT DOCUMENTS

JP 2008-241545 10/2008
JP 2009-192262 8/2009
(Continued)

OTHER PUBLICATIONS

International Search Report, Date of mailing: Sep. 9, 2020, 3 pages.
(Continued)

*Primary Examiner* — Sahar Motazedi
(74) *Attorney, Agent, or Firm* — Rankin, Hill & Clark LLP

(57) ABSTRACT

Information useful for aircraft control is provided for an airspace where a plurality of aircraft move. An airspace information provision system includes: a surrounding turbulence estimation unit configured to estimate surrounding turbulence occurring around first aircraft flying in a predetermined airspace where a plurality of aircraft fly, based on at least specification information, operation information and position information of the first aircraft, for the first aircraft; a flight disturbance information generation unit configured to generate flight disturbance information indicating a disturbance element affecting the aircraft flying in the predetermined airspace based on the surrounding turbulence; and a flight disturbance information provision unit configured to transmit the flight disturbance information to second aircraft (Continued)

flying in the predetermined airspace or flying toward the predetermined airspace.

5 Claims, 5 Drawing Sheets

(51) Int. Cl.
| | | |
|---|---|---|
| B64U 10/13 | (2023.01) | |
| B64U 30/20 | (2023.01) | |
| B64U 50/19 | (2023.01) | |
| B64U 101/60 | (2023.01) | |
| G01W 1/00 | (2006.01) | |

(52) U.S. Cl.
CPC ........... *G08G 5/0091* (2013.01); *B64U 10/13* (2023.01); *B64U 30/20* (2023.01); *B64U 50/19* (2023.01); *B64U 2101/60* (2023.01); *G01W 2001/003* (2013.01)

(58) Field of Classification Search
CPC .. G08G 5/0013; G08G 5/0026; G08G 5/0052; G08G 5/0082; B64D 45/00; G01W 2001/003; G01W 1/00; B64U 10/13; B64U 30/20; B64U 50/19; G05D 1/10
See application file for complete search history.

(56) References Cited

U.S. PATENT DOCUMENTS

| | | | | |
|---|---|---|---|---|
| 2008/0190192 | A1* | 8/2008 | Bommier | G01S 17/95 |
| | | | | 73/178 R |
| 2012/0259549 | A1* | 10/2012 | McDonald | G01W 1/00 |
| | | | | 702/3 |
| 2015/0097723 | A1* | 4/2015 | Bauman | G01S 17/95 |
| | | | | 342/357.51 |
| 2018/0122247 | A1* | 5/2018 | Rizzi | G08G 5/0091 |
| 2019/0147753 | A1* | 5/2019 | Hendrian | G05D 1/104 |
| | | | | 701/14 |
| 2019/0147755 | A1* | 5/2019 | Hampel | G08G 5/0021 |
| | | | | 701/14 |
| 2019/0367178 | A1* | 12/2019 | Matayoshi | G01P 21/025 |
| 2020/0013299 | A1* | 1/2020 | Jacobson | G08G 5/0091 |
| 2020/0013300 | A1* | 1/2020 | Reid | G08G 5/0017 |
| 2020/0148381 | A1* | 5/2020 | Schwindt | G08G 5/0078 |
| 2021/0011488 | A1* | 1/2021 | Kearney-Fischer | G05D 1/046 |

FOREIGN PATENT DOCUMENTS

| | | |
|---|---|---|
| JP | 2009-251730 | 10/2009 |
| JP | 2010-165180 | 7/2010 |
| JP | 2017-142778 | 8/2017 |
| JP | 2017-165365 | 9/2017 |
| WO | 2017/115807 | 7/2017 |

OTHER PUBLICATIONS

Written Opinion of the International Searching Authority dated Sep. 29, 2020 filed in PCT/JP2020/027143, 4 pages.
International Preliminary Report on Patentability dated Mar. 24, 2022, 6 pages.

* cited by examiner

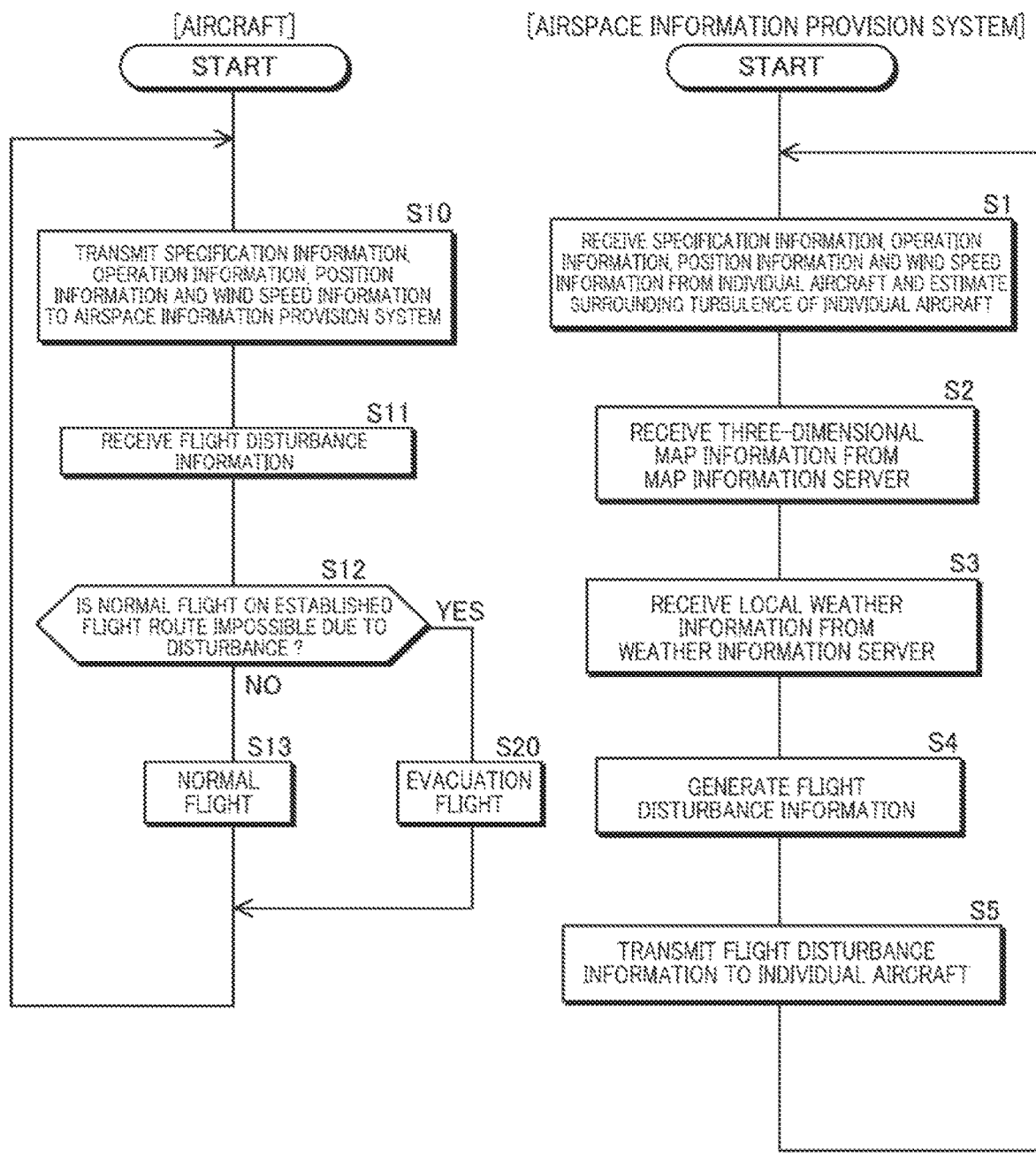

AIRSPACE INFORMATION PROVISION SYSTEM, AIRSPACE INFORMATION PROVISION METHOD, AND AIRSPACE INFORMATION PROVISION PROGRAM

TECHNICAL FIELD

The present invention relates to an airspace information provision system, an airspace information provision method and an airspace information provision program.

BACKGROUND ART

Conventionally, a moving body group control method which controls a plurality of aircraft as a group by stable calculation using a real physical model by likening a plurality of moving bodies to particles and performing group control by a procedure similar to a simulation by a particle method has been proposed (for example, see Patent Literature 1). The moving body may be an arbitrary object such as a small-sized aircraft like a multicopter and a traveling body like a truck.

CITATION LIST

Patent Literature

[Patent Literature 1]
Japanese Patent Laid-Open No. 2017-142778

SUMMARY OF INVENTION

Technical Problem

The conventional moving body group control method described above performs calculation assuming that density, a speed, internal energy, distortion, stress, attractive force and repulsive force or the like calculated in particles for which a continuum such as a fluid or a solid is approximated/discretized are generated in a pseudo manner in each moving body. However, in an airspace where an aircraft actually flies, there exist various factors which obstruct a flight such as climate conditions like wind power, influence of building wind caused by buildings and wake turbulence generated by movement of other aircraft. Therefore, in a case of depending on the conventional moving body group control method described above, there is a risk that it becomes difficult to control the plurality of aircraft.

The present invention is implemented in consideration of such a background, and an object is to provide an airspace information provision system, an airspace information provision method and airspace information provision program capable of providing information useful for aircraft control for an airspace where a plurality of aircraft move.

Solution to Problem

The present description includes entire contents of Japanese Patent Application No. 2019-166993 filed on Sep. 13, 2019.

A first aspect for achieving the object is an airspace information provision system including: a surrounding turbulence estimation unit configured to estimate surrounding turbulence occurring around a first aircraft flying in a predetermined airspace where a plurality of aircraft fly, based on at least specification information, operation information and position information of the first aircraft, for the first aircraft; a flight disturbance information generation unit configured to generate flight disturbance information indicating a disturbance element affecting the aircraft flying in the predetermined airspace based on the surrounding turbulence estimated by the surrounding turbulence estimation unit; and a flight disturbance information provision unit configured to transmit the flight disturbance information to a second aircraft flying in the predetermined airspace or flying toward the predetermined airspace.

In addition, in the airspace information provision system, a configuration may be such that the surrounding turbulence estimation unit estimates the surrounding turbulence for the plurality of first aircraft, and the flight disturbance information generation unit generates the flight disturbance information based on the surrounding turbulence for the plurality of first aircraft estimated by the surrounding turbulence estimation unit.

In the airspace information provision system, the configuration may be such that the flight disturbance information generation unit generates the flight disturbance information indicating a distribution of an air pressure or a wind speed in the predetermined airspace as the disturbance element.

In the airspace information provision system, the configuration may be such that the flight disturbance information generation unit generates the flight disturbance information based on the surrounding turbulence and the wind speed near the first aircraft detected by the first aircraft.

In the airspace information provision system, the configuration may be such that the system includes a weather information acquisition unit configured to acquire weather information of the predetermined airspace, and the flight disturbance information generation unit generates the flight disturbance information based on the surrounding turbulence and the weather information.

In the airspace information provision system, the configuration may be such that the system includes a three-dimensional map information acquisition unit configured to acquire three-dimensional map information of the predetermined airspace or a periphery of the predetermined airspace, and the flight disturbance information generation unit generates the flight disturbance information based on the surrounding turbulence and the three-dimensional map information.

In the airspace information provision system, the configuration may be such that the first aircraft includes a plurality of rotors, and the specification information of the first aircraft includes at least one of a number of pieces of the rotors of the first aircraft, weight of the first aircraft and a size of the first aircraft.

In the airspace information provision system, the configuration may be such that the first aircraft includes a rotor, and the operation information of the first aircraft includes at least one of a rotational speed of the rotor of the first aircraft, a flying speed of the first aircraft and a flight route of the first aircraft.

In the airspace information provision system, the configuration may be such that the airspace information provision system is configured including the second aircraft, and the second aircraft determines whether to perform a normal flight or an evacuation flight based on the flight disturbance information.

Next, a second aspect for achieving the object is an airspace information provision method executed by a computer system, the method including: a surrounding turbulence estimation step of estimating surrounding turbulence occurring around a first aircraft flying in a predetermined airspace where a plurality of aircraft fly, based on at least specification information, operation information and position information of the first aircraft, for the first aircraft; a flight disturbance information generation step of generating flight disturbance information indicating a disturbance element affecting the aircraft flying in the predetermined airspace based on the surrounding turbulence estimated by the surrounding turbulence estimation step; and a flight disturbance information provision step of transmitting the flight disturbance information to a second aircraft flying in the predetermined airspace or flying toward the predetermined airspace.

Then, a third aspect for achieving the object is an airspace information provision program for making a computer function as: a surrounding turbulence estimation unit configured to estimate surrounding turbulence occurring around a first aircraft flying in a predetermined airspace where a plurality of aircraft fly, based on at least specification information, operation information and position information of the first aircraft, for the first aircraft; a flight disturbance information generation unit configured to generate flight disturbance information indicating a disturbance element affecting the aircraft flying in the predetermined airspace based on the surrounding turbulence estimated by the surrounding turbulence estimation unit; and a flight disturbance information provision unit configured to transmit the flight disturbance information to a second aircraft flying in the predetermined airspace or flying toward the predetermined airspace.

Advantageous Effects of Invention

According to the airspace information provision system, the surrounding turbulence occurring around the first aircraft is estimated based on the specification information, operation information and position information of the first aircraft flying in the predetermined airspace by the surrounding turbulence estimation unit. Then, the flight disturbance information is generated based on the surrounding turbulence by the flight disturbance information generation unit, and the flight disturbance information is transmitted to an aircraft flying in the predetermined airspace or flying toward the predetermined airspace by the flight disturbance information provision unit. Since the flight disturbance information is information indicating the disturbance element occurring in the predetermined airspace in real time, the information useful for aircraft control can be provided for an airspace where a plurality of aircraft fly.

BRIEF DESCRIPTION OF DRAWINGS

FIG. 5 is an operation flowchart of the airspace information provision system and the aircraft.

DESCRIPTION OF EMBODIMENTS

1. Configuration of Airspace Information Provision System

Figure 1:
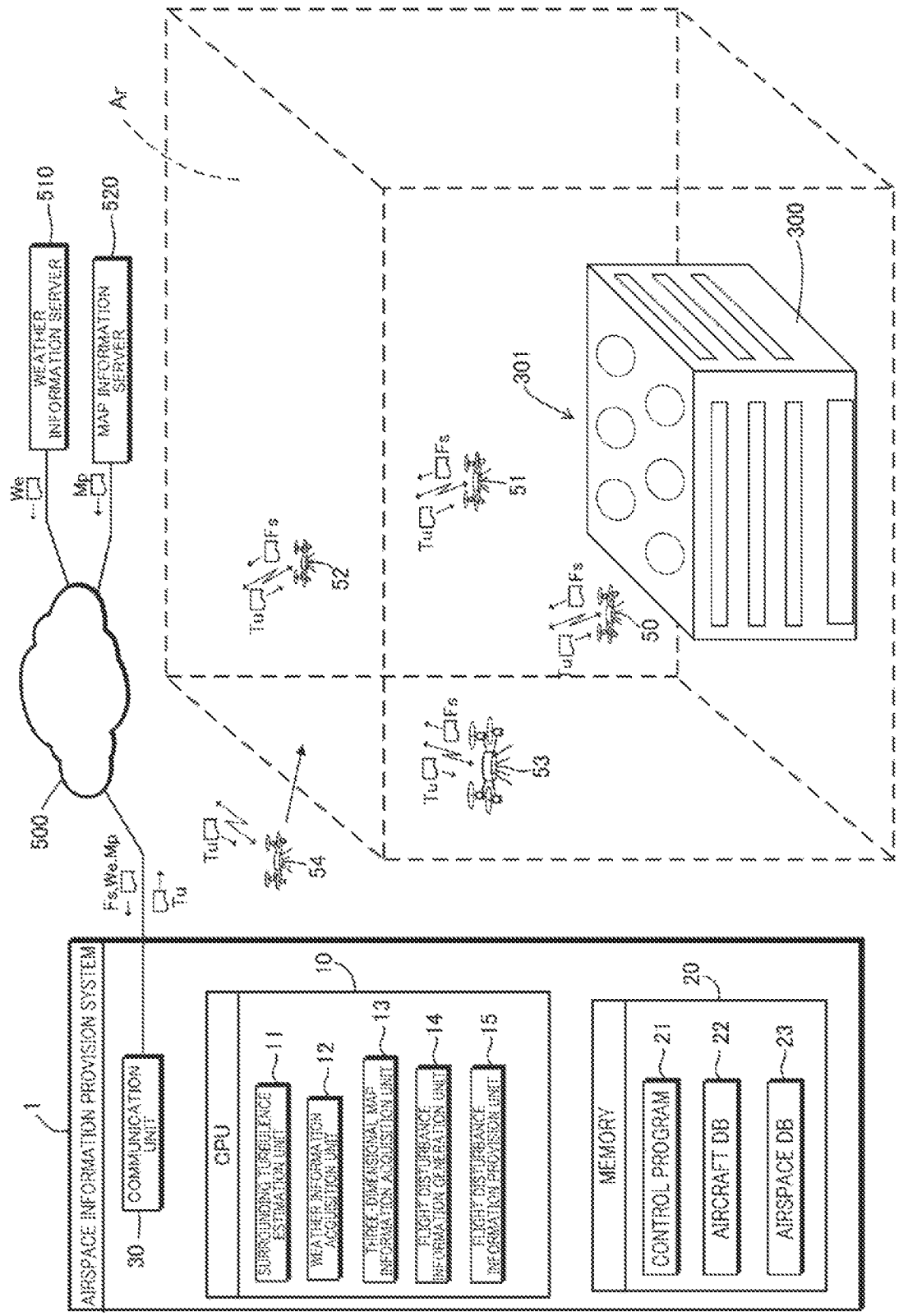
FIG. 1 is an explanatory drawing of a configuration of an airspace information provision system.

With reference to FIG. 1, the configuration of an airspace information provision system 1 of the present embodiment and a provision mode of flight disturbance information by the airspace information provision system 1 will be described. The airspace information provision system 1 is a computer system configured by a CPU (Central Processing Unit) 10, a memory 20 and a communication unit 30 or the like.

The airspace information provision system 1 is a server system which communicates with a weather information server 510, a map information server 520, aircraft 50-53 flying in a predetermined airspace Ar and an aircraft 54 heading to the predetermined airspace Ar via a communication network 500 by the communication unit 30. FIG. 1 illustrates eVTOLs (electric Vertical Takeoff and Landing aircraft, for example drones) provided with four rotor blades as the aircraft 50-54. The aircraft 50-54 transport goods or the like by landing on a takeoff/landing place 301 installed on a roof of a building 300 and taking off from the takeoff/landing place 301.

The CPU 10 functions as a surrounding turbulence estimation unit 11, a weather information acquisition unit 12, a three-dimensional map information acquisition unit 13, a flight disturbance information generation unit 14 and a flight disturbance information provision unit 15 by reading and executing a control program 21 of the airspace information provision system 1 preserved in the memory 20. In the memory 20, in addition to the control program 21, an aircraft DB (data base) 22 in which a model of the aircraft and the specifications (a size, weight and a number of propellers or the like) are associated and recorded and an airspace DB 23 in which flight disturbance information of a plurality of airspaces including the predetermined airspace Ar is recorded are preserved. The airspace information provision system 1 may read the control program 21 from a recording medium (an optical disk or a flash memory or the like) wherein the control program 21 is recorded, or may download the control program 21 from an external server.

Processing executed by the surrounding turbulence estimation unit 11 corresponds to a surrounding turbulence estimation step in an airspace information provision method of the present invention. Processing executed by the flight disturbance information generation unit 14 corresponds to a flight disturbance information generation step in the airspace information provision method of the present invention. Processing executed by the flight disturbance information provision unit 15 corresponds to a flight disturbance information provision step in the airspace information provision method of the present invention.

The surrounding turbulence estimation unit 11 receives flight condition information Fs transmitted from the aircraft 50-53 flying in the predetermined airspace Ar and estimates surrounding turbulence occurring around the individual aircraft 50-53. For example, the surrounding turbulence estimation unit 11 estimates the surrounding turbulence occurring around the aircraft 50 based on the flight condition information Fs transmitted from the aircraft 50. The aircraft 50-53 which transmit the flight condition information Fs to the airspace information provision system 1 correspond to first aircraft of the present invention.

The flight condition information Fs includes specification information, operation information and position information of the aircraft 50-53. The specification information includes the size, the weight, the number of equipped rotor blades and an arrangement mode of the rotor blades or the like of the aircraft. The operation information includes a rotational speed of the rotor blades, a flying speed of the aircraft and an established flight route or the like. The position information includes a current position of the aircraft. Further, the flight condition information Fs includes wind speeds at the current positions of the individual aircraft 50-53 detected by the individual aircraft 50-53.

The weather information acquisition unit 12 accesses the weather information server 510 and receives weather information We of the predetermined airspace Ar. The three-dimensional map information acquisition unit 13 accesses the map information server 520 and receives three-dimensional map information indicating a position and a height of architecture at a lower part of the predetermined airspace Ar and an elevation of a landform or the like.

The flight disturbance information generation unit 14 generates flight disturbance information Tu indicating a disturbance element in the predetermined airspace Ar, based on the surrounding turbulence occurring around the individual aircraft 50-53 estimated by the surrounding turbulence estimation unit 11, weather of the predetermined airspace Ar acquired by the weather information acquisition unit 12, a three-dimensional map of the lower part of the predetermined airspace Ar acquired by the three-dimensional map information acquisition unit 13 and the wind speeds detected by the individual aircraft 50-53.

Figure 2:
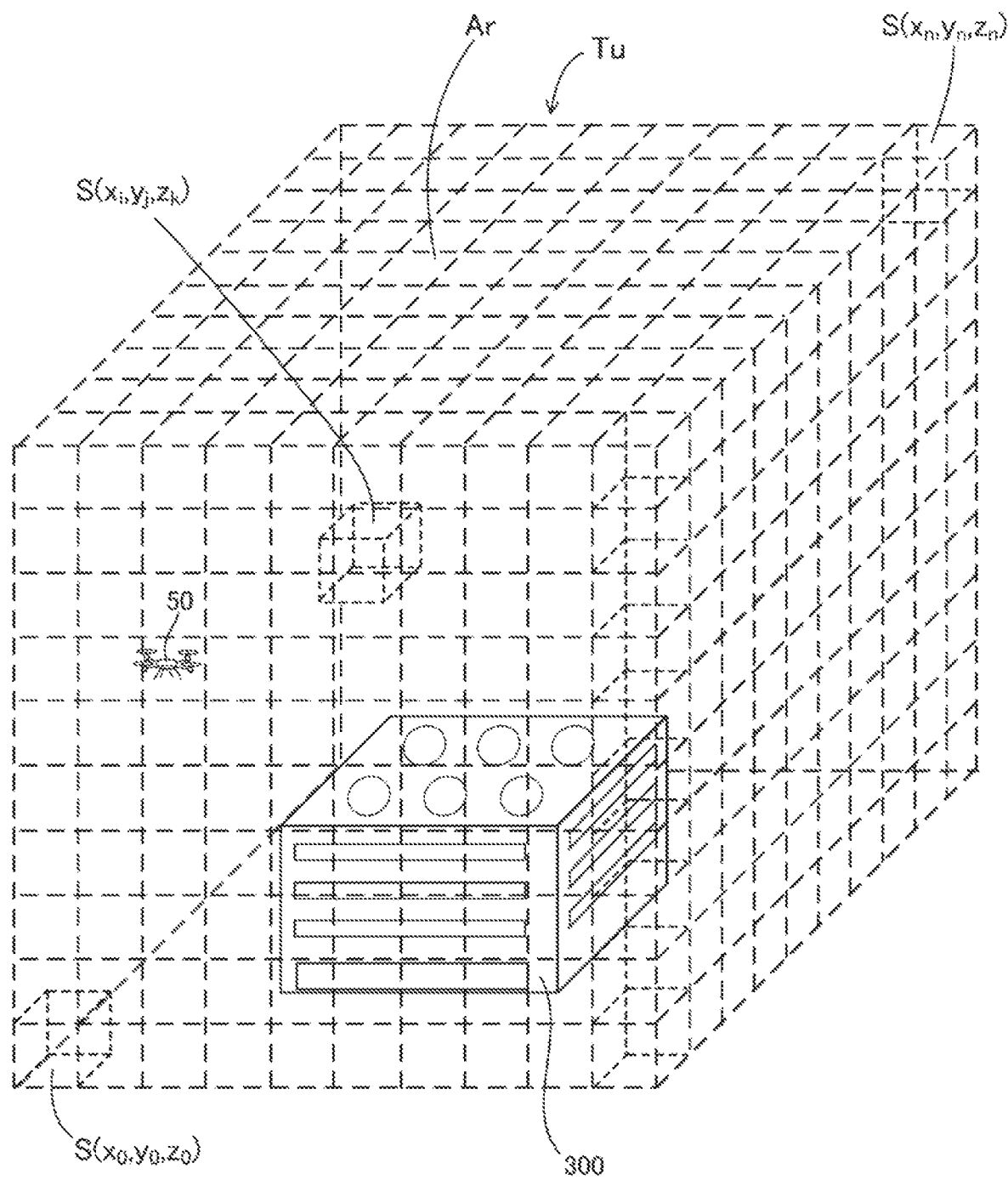
FIG. 2 is an explanatory drawing of flight disturbance information.

FIG. 2 illustrates a configuration example of the flight disturbance information Tu. The flight disturbance information Tu illustrated in FIG. 2 is the information which sections the predetermined airspace Ar by $(n+1)\times(n+1)\times(n+1)$ (n is a natural number) pieces of spatial blocks $S(x_i, y_j, z_k)$ ($i=0, 1, 2, \ldots n, j=0, 1, 2, \ldots n, k=0, 1, 2, \ldots n$) and indicates wind directions and wind speeds in the individual spatial blocks.

In this way, by transmitting the flight disturbance information Tu indicating the wind directions and the wind speeds of the individual spatial blocks of the predetermined airspace Ar to the individual aircraft 50-54, the individual aircraft 50-54 can control an attitude angle or the like in consideration of the disturbance when flying in the predetermined airspace Ar.

2. Configuration of Aircraft

Figure 3:
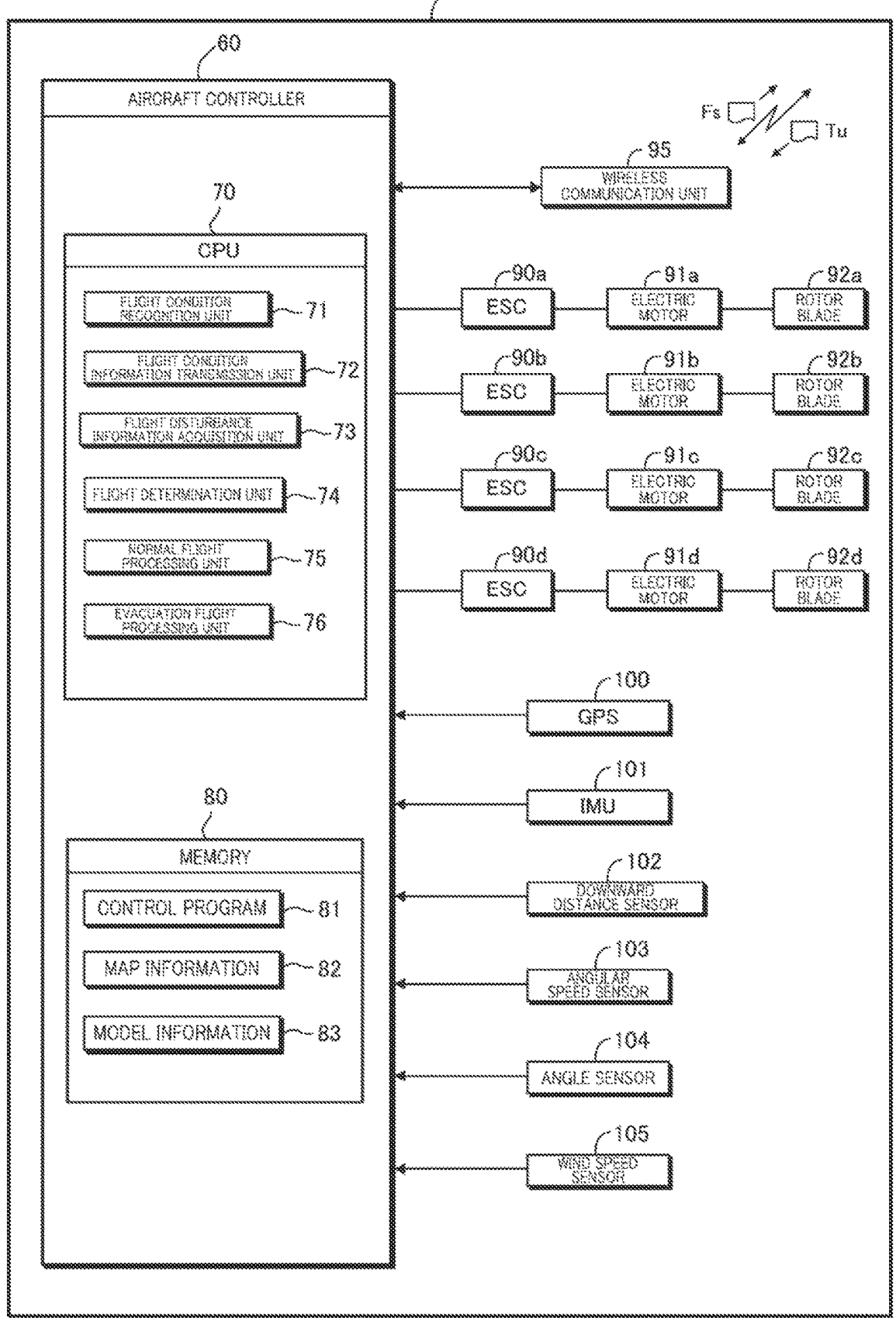
FIG. 3 is an explanatory drawing of the configuration of an aircraft.
Figure 4:
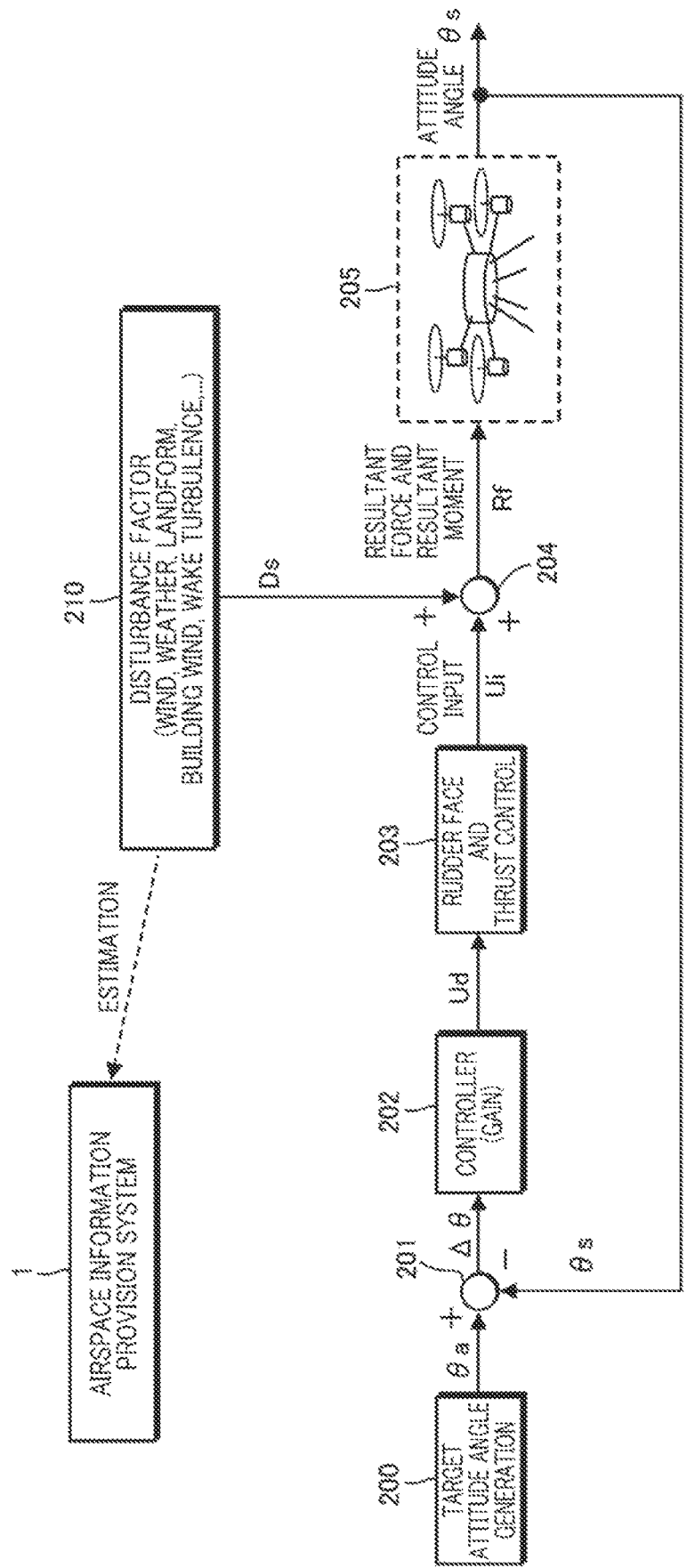
FIG. 4 is an explanatory drawing of influence of disturbance in aircraft control.

With reference to FIG. 3-FIG. 4, the configuration of the aircraft 50 will be described. Note that, since the configuration of the aircraft 51-54 is similar to that of the aircraft 50, the aircraft 50 will be described here. With reference to FIG. 3, the aircraft 50 includes an aircraft controller 60 which controls an overall operation of the aircraft 50 and a wireless communication unit 95 which performs wireless communication via the communication network 500 (see FIG. 1).

In addition, the aircraft 50 includes ESCs (Electric Stability Controls) 90a, 90b, 90c and 90d for driving four rotor blades 92a, 92b, 92c and 92d, and electric motors 91a, 91b, 91c and 91d. Further, the aircraft 50 includes a GPS (Global Positioning System) 100, an IMU (Inertial Measurement Unit) 101 which detects an angular speed and acceleration of three axes of the aircraft 50, a downward distance sensor 102 which detects a distance between the aircraft 50 and a ground surface, an angular speed sensor 103 which detects the angular speed of the aircraft 50, an angle sensor 104 which detects the attitude angle of the aircraft 50 and a wind speed sensor 105 which detects the wind speed around the aircraft 50.

A CPU 70 of the aircraft controller 60 functions as a flight condition recognition unit 71, a flight condition information transmission unit 72, a flight disturbance information acquisition unit 73, a flight determination unit 74, a normal flight processing unit 75 and an evacuation flight processing unit 76 by reading and executing a control program 81 of the aircraft 50 preserved in a memory 80. In the memory 80, in addition to the control program 81, map information 82 and model information 83 are preserved. In the map information 82, a map including the established flight route of the aircraft 50 is recorded. In the model information 83, a model name, the size, the weight, the number of the equipped rotor blades and the arrangement mode of the rotor blades or the like of the aircraft 50 are recorded.

The flight condition recognition unit 71 recognizes the rotational speed of the rotor blades 92a-92d, the current position of the aircraft 50 detected by the GPS 100, the angular speed and the acceleration of the three axes of the aircraft 50 measured by the IMU 101, the distance between the aircraft 50 and the ground surface detected by the downward distance sensor 102, the angular speed of the aircraft 50 detected by the angular speed sensor 103, the attitude angle of the aircraft 50 detected by the angle sensor 104 and the wind speed around the aircraft 50 detected by the wind speed sensor 105. In addition, the flight condition recognition unit 71 refers to the model information 83 preserved in the memory 80 and recognizes the specifications (the size, the weight, the number of the equipped rotor blades and the arrangement mode of the rotor blades or the like) of the aircraft 50.

Then, the flight condition recognition unit 71 generates the flight condition information Fs based on the recognition results. The flight condition information Fs includes the specification information, the operation information, the position information and wind speed information of the aircraft 50. The flight condition information transmission unit 72 transmits the flight condition information Fs to the airspace information provision system 1 via the wireless communication unit 95.

The flight disturbance information acquisition unit 73 receives the flight disturbance information Tu for the predetermined airspace Ar from the airspace information provision system 1 as described above. The flight determination unit 74 determines whether or not a normal flight on the established flight route (for example, the flight route to the takeoff/landing place 301) set in the predetermined airspace Ar is possible, based on the flight disturbance information Tu.

In a case where it is determined that the normal flight on the established route is possible by the flight determination unit 74, the normal flight processing unit 75 performs normal flight processing to fly the established flight route. In the case where it is determined that the normal flight on the established route is impossible by the flight determination unit 74, the evacuation flight processing unit 76 executes evacuation flight processing of moving the aircraft 50 to a position where it is possible to avoid influence of the disturbance, changing the flying speed of the aircraft 50 or changing the flight route or the like.

Here, FIG. 4 illustrates a model of attitude angle control of an airframe 205 of the aircraft 50 executed by the aircraft controller 60. The controller 60 generates a target attitude angle $\theta a$ of the aircraft 50 by a target attitude angle generation unit 200, and calculates a difference $\Delta\theta$ ($=\theta a-\theta s$) between the target attitude angle $\theta a$ and an actual attitude angle (measured attitude angle) $\theta s$ of the aircraft 50 by a subtracter 201.

Then, the aircraft controller 60 performs an arithmetic operation of rudder face control and thrust control based on a control instruction value Ud calculated by amplifying $\Delta\theta$ by a rudder face and thrust controller 203 and determines control input Ui to the aircraft 50. By the control input Ui determined in such a manner, output of the four rotor blades 92a-92d or the like of the aircraft 50 is controlled, however, a disturbance factor 210 (Ds) such as wind, the weather, the landform, building wind and wake turbulence of another aircraft acts on the aircraft 50.

In this way, to the aircraft 50, resultant force and resultant moment Rf for which action of the disturbance factor Ds added in an adder 204 is added to propulsive force according to the control input Ui is imparted. Therefore, there is the case where the attitude angle of the aircraft 50 is shifted greatly from the target attitude angle θa and the flight of the aircraft 50 becomes instable due to the disturbance factor Ds.

Accordingly, by transmitting the flight disturbance information Tu for the predetermined airspace Ar from the airspace information provision system 1 to the aircraft 50, the aircraft 50 can more appropriately control the attitude angle in consideration of the disturbance element which is occurring in the predetermined airspace Ar and is recognized from the flight disturbance information Tu.

3. Processing in Airspace Information Provision System and Aircraft

According to a flowchart illustrated in FIG. 5, a series of processing executed in the airspace information provision system 1 and the individual aircraft 50-54 will be described.

The airspace information provision system 1 repeatedly executes loop processing of steps S1-S5 in FIG. 5. In step S1, the surrounding turbulence estimation unit 11 (see FIG. 1) receives the specification information, the operation information, the position information and the wind speed information or the like transmitted from the individual aircraft 50-53 and estimates the surrounding turbulence occurring around the individual aircraft 50.

In following step S2, the three-dimensional map information acquisition unit 13 (see FIG. 1) accesses the map information server 520 and acquires the three-dimensional map information of a region below the predetermined airspace Ar. In next step S3, the weather information acquisition unit 12 (see FIG. 1) accesses the weather information server 510 and acquires the weather information We of the predetermined airspace Ar.

In following step S4, the flight disturbance information generation unit 14 (see FIG. 1) generates the flight disturbance information Tu for the predetermined airspace Ar, based on the surrounding turbulence of the individual aircraft 50-53 estimated by the surrounding turbulence estimation unit 11, the three-dimensional map information of the region below the predetermined airspace Ar, the weather information We of the predetermined airspace Ar and the wind speeds detected by the individual aircraft 50-53 or the like. In next step S5, the flight disturbance information provision unit 15 (see FIG. 1) transmits the flight disturbance information Tu to the aircraft 50-53 flying in the predetermined airspace Ar and the aircraft 54 heading to the predetermined airspace Ar.

On the other hand, the individual aircraft 50-54 repeatedly execute the loop processing of step S10-step S13 or step S10-step S20. Step S10 is the processing by the flight condition recognition unit 71 (see FIG. 3) and the flight condition information transmission unit 72 (see FIG. 3) of the individual aircraft 50-54. Since the processing in the individual aircraft 50-54 is similar, the processing by the aircraft 50 will be described here.

The flight condition recognition unit 71 generates the flight condition information Fs including the specification information (the size, the weight, the number of the rotor blades and the arrangement mode of the rotor blades or the like) of the aircraft 50, the operation information (the rotational speed of the rotor blades 92a-92d, the current position of the aircraft 50, the angular speed and the acceleration of the three axes of the aircraft 50, the distance between the aircraft 50 and the ground surface detected by the downward distance sensor 102, the angular speed of the aircraft 50 detected by the angular speed sensor 103 and the attitude angle of the aircraft 50 detected by the angle sensor 104), the position information (the current position of the aircraft 50) and the wind speed around the aircraft 50 detected by the wind speed sensor 105. The flight condition information transmission unit 72 transmits the flight condition information Fs recognized by the flight condition recognition unit 71 to the airspace information provision system 1.

In following step S11, the flight disturbance information acquisition unit 73 (see FIG. 3) receives the flight disturbance information Tu from the airspace information provision system 1. In next step S12, the flight determination unit 74 determines whether or not the normal flight on the established flight route is possible based on the flight disturbance information Tu.

Then, the flight determination unit 74 advances the processing to step S13 in the case of determining that the normal flight on the established flight route is possible, and advances the processing to step S20 in the case of determining that the normal flight on the established flight route is impossible. In step S13, the normal flight processing unit 75 performs the normal flight processing and advances the processing to step S10. In addition, in step S20, the evacuation flight processing unit 76 executes the evacuation flight processing and advances the processing to step S10. Thus, the aircraft 50 can avoid the influence of the disturbance and fly in the predetermined airspace Ar.

4. Other Embodiments

In the embodiment described above, the flight disturbance information generation unit 14 generates the flight disturbance information Tu using the weather information We, three-dimensional map information Mp and the wind speeds detected by the aircraft 50-53. As another configuration, the flight disturbance information Tu may be generated without using the weather information We, the three-dimensional map information Mp and the wind speeds detected by the aircraft 50-53. Further, the flight disturbance information Tu may be generated using at least one of the weather information We, the three-dimensional map information Mp and the wind speeds detected by the aircraft 50-53.

While the eVTOLs are illustrated as the aircraft 50-54 in the embodiment described above, they may be the aircraft of another kind. In this case, the specification information and the operation information transmitted from the aircraft are set according to the specifications of the aircraft.

While the airspace information provision system 1 is configured as the server system in the embodiment described above, the airspace information provision system 1 may be configured as a part of functions of a management system of the building 300 where the takeoff/landing place 301 is installed, for example.

While the flight disturbance information Tu is configured to section the predetermined airspace Ar by the plurality of spatial blocks and indicates the wind directions and the wind speeds in the individual spatial blocks as illustrated in FIG. 2 in the embodiment described above, the specification of the flight disturbance information is not limited thereto. For example, as the flight disturbance information, information indicating a range, a direction and strength of the turbulence occurring in the predetermined airspace Ar may be generated.

Note that FIG. 1 is a schematic drawing which illustrates a functional configuration of the airspace information provision system 1 in divisions by main processing contents in order to facilitate understanding of the claimed invention, and the functional configuration of the airspace information provision system 1 may be configured in other divisions. In addition, the processing of an individual component may be executed by one hardware unit or may be executed by a plurality of hardware units. Further, the processing of the individual component illustrated in FIG. 1 may be executed by one program or may be executed by a plurality of programs.

5. Configuration Supported by Embodiment Described Above

The embodiment described above is a specific example of the following configuration.

(Item 1) An airspace information provision system including: a surrounding turbulence estimation unit configured to estimate surrounding turbulence occurring around a first aircraft flying in a predetermined airspace where a plurality of aircraft fly, based on at least specification information, operation information and position information of the first aircraft, for the first aircraft; a flight disturbance information generation unit configured to generate flight disturbance information indicating a disturbance element affecting the aircraft flying in the predetermined airspace based on the surrounding turbulence estimated by the surrounding turbulence estimation unit; and a flight disturbance information provision unit configured to transmit the flight disturbance information to a second aircraft flying in the predetermined airspace or flying toward the predetermined airspace.

According to the airspace information provision system of Item 1, the surrounding turbulence occurring around the first aircraft is estimated based on the specification information, the operation information and the position information of the first aircraft flying in the predetermined airspace by the surrounding turbulence estimation unit. Then, the flight disturbance information is generated based on the surrounding turbulence by the flight disturbance information generation unit, and the flight disturbance information is transmitted to the aircraft flying in the predetermined airspace or flying toward the predetermined airspace by the flight disturbance information provision unit. Since the flight disturbance information is the information indicating the disturbance element occurring in the predetermined airspace in real time, the information useful for aircraft control can be provided for an airspace where a plurality of aircraft fly.

(Item 2) The airspace information provision system according to Item 1, wherein the surrounding turbulence estimation unit estimates the surrounding turbulence for the plurality of first aircraft, and the flight disturbance information generation unit generates the flight disturbance information based on the surrounding turbulence for the plurality of first aircraft estimated by the surrounding turbulence estimation unit.

According to the airspace information provision system of Item 2, the flight disturbance information for the predetermined airspace can be generated in more detail by estimating the surrounding turbulence for the plurality of first aircraft.

(Item 3) The airspace information provision system according to Item 1 or Item 2, wherein the flight disturbance information generation unit generates the flight disturbance information indicating a distribution of an air pressure or a wind speed in the predetermined airspace as the disturbance element.

According to the airspace information provision system of Item 3, the aircraft can be provided with the information of the distribution of the air pressure or the wind speed which greatly affects the flight of the aircraft.

(Item 4) The airspace information provision system according to any one of Item 1 to Item 3, wherein the flight disturbance information generation unit generates the flight disturbance information based on the surrounding turbulence and the wind speed near the first aircraft detected by the first aircraft.

According to the airspace information provision system of Item 4, by using the wind speed near the first aircraft detected by the first aircraft, accuracy of the flight disturbance information can be improved.

(Item 5) The airspace information provision system according to any one of Item 1 to Item 4, including a weather information acquisition unit configured to acquire weather information of the predetermined airspace, wherein the flight disturbance information generation unit generates the flight disturbance information based on the surrounding turbulence and the weather information.

According to the airspace information provision system of Item 5, by using the weather information, the accuracy of the flight disturbance information can be improved.

(Item 6) The airspace information provision system according to any one of Item 1 to Item 5, including a three-dimensional map information acquisition unit configured to acquire three-dimensional map information of the predetermined airspace or a periphery of the predetermined airspace, wherein the flight disturbance information generation unit generates the flight disturbance information based on the surrounding turbulence and the three-dimensional map information.

According to the airspace information provision system of Item 6, by using the three-dimensional map information, the flight disturbance information can be generated in consideration of the influence of irregular wind due to a building on the ground surface and the landform.

(Item 7) The airspace information provision system according to any one of Item 1 to Item 6, wherein the first aircraft includes a plurality of rotors, and the specification information of the first aircraft includes at least one of a number of pieces of the rotors of the first aircraft, weight of the first aircraft and a size of the first aircraft.

According to the airspace information provision system of Item 7, by considering at least one of the number of pieces of the rotors, the weight and the size of the first aircraft, the surrounding turbulence of the first aircraft can be more accurately estimated.

(Item 8) The airspace information provision system according to any one of Item 1 to Item 7, wherein the first aircraft includes a rotor, and the operation information of the first aircraft includes at least one of a rotational speed of the rotor of the first aircraft, a flying speed of the first aircraft and a flight route of the first aircraft.

According to the airspace information provision system of Item 8, by considering at least one of the rotational speed of the rotor, the flying speed and the flight route of the first aircraft, the surrounding turbulence of the first aircraft can be more accurately estimated.

(Item 9) The airspace information provision system according to any one of Item 1 to Item 8, the airspace information provision system being configured including the second aircraft, wherein the second aircraft determines whether to perform a normal flight or an evacuation flight based on the flight disturbance information.

According to the airspace information provision system of Item 9, the appropriate flight of the second aircraft can be supported based on the flight disturbance information.

(Item 10) An airspace information provision method executed by a computer system, the method including: a surrounding turbulence estimation step of estimating surrounding turbulence occurring around a first aircraft flying in a predetermined airspace where a plurality of aircraft fly, based on at least specification information, operation information and position information of the first aircraft, for the first aircraft; a flight disturbance information generation step of generating flight disturbance information indicating a disturbance element affecting the aircraft flying in the predetermined airspace based on the surrounding turbulence estimated by the surrounding turbulence estimation step; and a flight disturbance information provision step of transmitting the flight disturbance information to a second aircraft flying in the predetermined airspace or flying toward the predetermined airspace.

According to an airspace information provision method of Item 10, the surrounding turbulence occurring around the first aircraft is estimated based on the specification information, the operation information and the position information of the first aircraft flying in the predetermined airspace by the surrounding turbulence estimation step. Then, the flight disturbance information is generated based on the surrounding turbulence by the flight disturbance information generation step, and the flight disturbance information is transmitted to the aircraft flying in the predetermined airspace or flying toward the predetermined airspace by the flight disturbance information provision step. Since the flight disturbance information is the information indicating the disturbance element occurring in the predetermined airspace in real time, the information useful for aircraft control can be provided for an airspace where a plurality of aircraft fly.

(Item 11) An airspace information provision program for making a computer function as: a surrounding turbulence estimation unit configured to estimate surrounding turbulence occurring around a first aircraft flying in a predetermined airspace where a plurality of aircraft fly, based on at least specification information, operation information and position information of the first aircraft, for the first aircraft; a flight disturbance information generation unit configured to generate flight disturbance information indicating a disturbance element affecting the aircraft flying in the predetermined airspace based on the surrounding turbulence estimated by the surrounding turbulence estimation unit; and a flight disturbance information provision unit configured to transmit the flight disturbance information to a second aircraft flying in the predetermined airspace or flying toward the predetermined airspace.

By making the computer execute the airspace information provision program of Item 11, the configuration of the airspace information provision system of Item 1 can be realized.

INDUSTRIAL APPLICABILITY

By transmitting flight disturbance information which is generated based on surrounding turbulence of an aircraft flying in a predetermined airspace and indicates a disturbance element in the predetermined airspace in real time to the aircraft flying in the predetermined airspace or flying toward the predetermined airspace, application to a use of providing information useful for aircraft control for an airspace where a plurality of aircraft fly is possible.

REFERENCE SIGNS LIST

1 . . . airspace information provision system, 10 . . . CPU, 11 . . . surrounding turbulence estimation unit, 12 . . . weather information acquisition unit, 13 . . . three-dimensional map information acquisition unit, 14 . . . flight disturbance information generation unit, 15 . . . flight disturbance information provision unit, 20 . . . memory, 21 . . . control program (of airspace information provision system), 22 . . . aircraft DB, 23 . . . airspace DB, 50-54 . . . aircraft, 301 . . . takeoff/landing place, 500 . . . communication network, 510 . . . weather information server, 520 . . . map information server, Ar . . . predetermined airspace, Fs . . . flight condition information, Tu . . . flight disturbance information

The invention claimed is:

1. A system comprising:
a first aircraft flying in a predetermined airspace;
a second aircraft heading to the predetermined airspace; and
an airspace information provision server comprising a central processing unit (CPU) that functions as, by reading and executing a control program preserved in a memory:
  a weather information acquisition unit configured to receive, via a communication network and from a weather information server, weather information of the predetermined airspace;
  a three-dimensional map information acquisition unit configured to receive, via the communication network and from a map information server, three-dimensional map information indicating a position and a height of architecture at a lower part of the predetermined airspace and an elevation of a landform below the predetermined airspace;
  a surrounding turbulence estimation unit configured to receive, from the first aircraft, flight condition information including specification information, operation information, and position information of the first aircraft via the communication network, and estimate a surrounding turbulence occurring around the first aircraft based on the flight condition information received;
  a flight disturbance information generation unit configured to generate flight disturbance information indicating a disturbance element affecting the first aircraft flying in the predetermined airspace based on the surrounding turbulence occurring around the first aircraft estimated by the surrounding turbulence estimation unit, the weather information of the predetermined airspace received from the weather information server, the three-dimensional map information received from the map information server, and a wind speed near the first aircraft detected by the first aircraft; and
  a flight disturbance information provision unit configured to transmit the flight disturbance information generated by the flight disturbance information generation unit to the second aircraft flying toward the predetermined airspace, wherein the second aircraft includes an aircraft controller that is configured (i) to determine whether or not flight on an established flight route in the predetermined airspace is possible based on the flight disturbance information transmitted by the flight disturbance information provision unit, and (ii), in a case where it is determined that the flight on the established flight route is impossible, to execute an evacuation flight processing of moving the second aircraft to a position where it is possible to avoid influence of the disturbance element, or changing a flying speed of the second aircraft.

2. The system according to claim 1,
wherein the first aircraft comprises a plurality of first aircrafts, and
wherein the flight disturbance information generation unit generates the flight disturbance information based on the flight condition information received from the plurality of first aircrafts.

3. The system according to claim 1,
wherein the flight disturbance information generation unit generates the flight disturbance information indicating a distribution of an air pressure or a distribution of the wind speed in the predetermined airspace as the disturbance element.

4. The system according to claim 1,
wherein the first aircraft includes a plurality of rotors, and
the specification information of the first aircraft includes at least one of a number of pieces of the rotors of the first aircraft, weight of the first aircraft and a size of the first aircraft.

5. The system according to claim 1,
wherein the first aircraft includes a rotor, and
the operation information of the first aircraft includes at least one of a rotational speed of the rotor of the first aircraft, a flying speed of the first aircraft and a flight route of the first aircraft.

* * * * *